Sept. 30, 1947.    S. A. CROSBY    2,428,204
EXTENSION HANDLE FOR RUBBING MACHINES
Filed Oct. 2, 1946    2 Sheets-Sheet 1
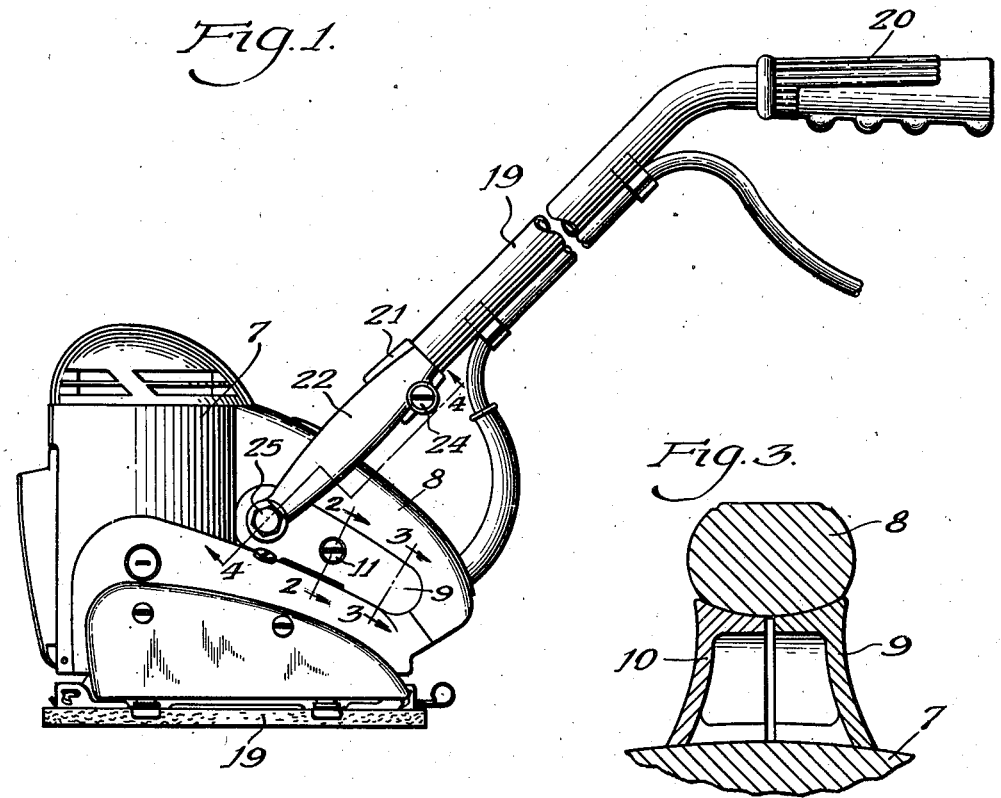
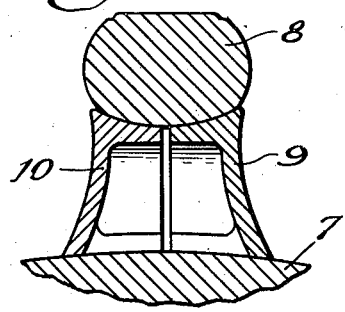
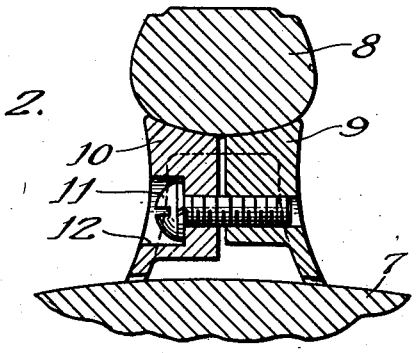
INVENTOR.
Stephen A. Crosby
BY
Chritton, Schroeder, Merriam & Hofgren
Attorneys Sept. 30, 1947.  S. A. CROSBY  2,428,204
EXTENSION HANDLE FOR RUBBING MACHINES
Filed Oct. 2, 1946  2 Sheets-Sheet 2
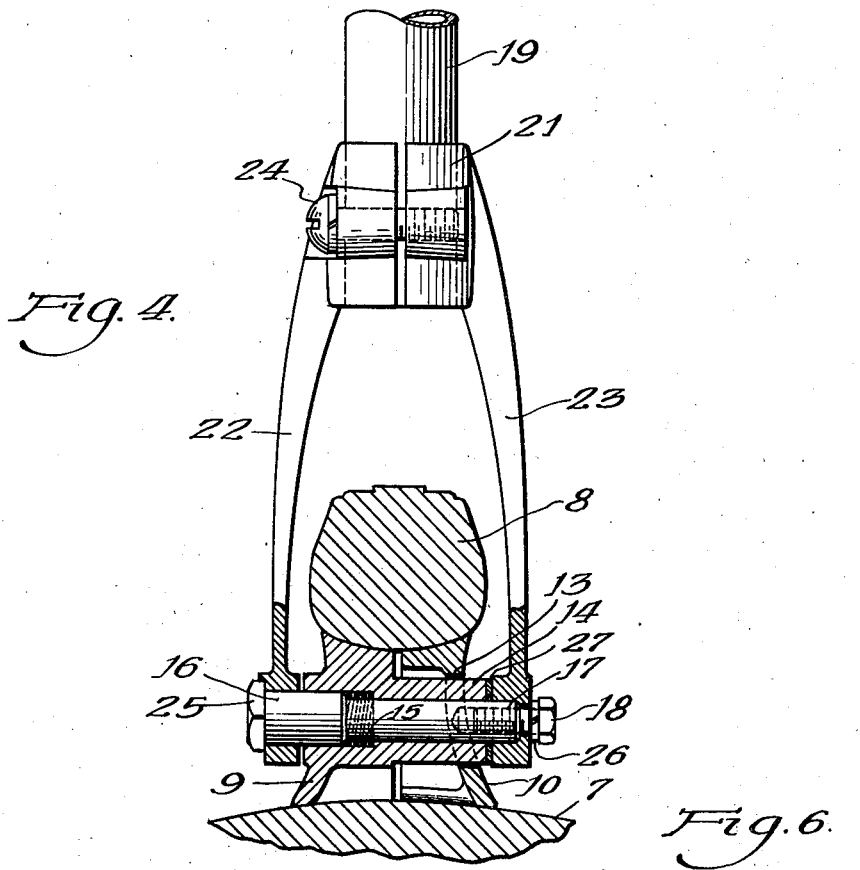
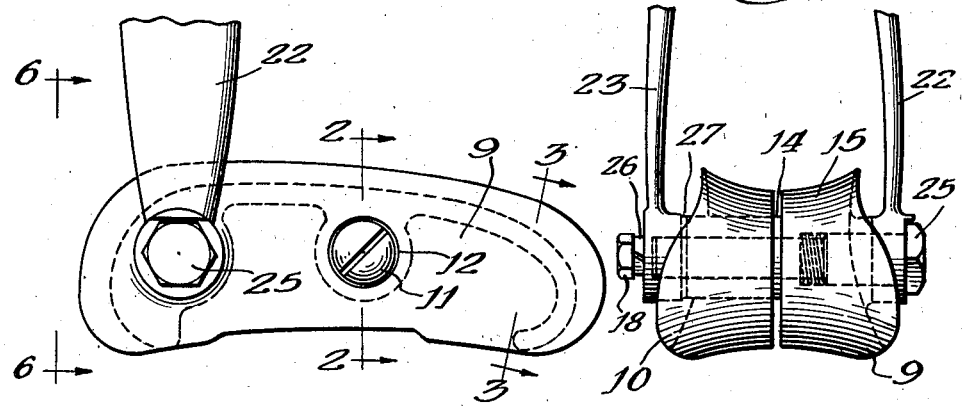
INVENTOR.
Stephen A. Crosby
BY
Chritton, Schroeder, Merriam & Hofgren
Attorneys Patented Sept. 30, 1947

2,428,204

UNITED STATES PATENT OFFICE 2,428,204

EXTENSION HANDLE FOR RUBBING MACHINES

Stephen A. Crosby, Chicago, Ill., assignor to Sterling Tool Products Company, a corporation of Illinois Application October 2, 1946, Serial No. 700,786

3 Claims. (Cl. 306—2)

This invention relates to rubbing machines and more particularly to small power driven sanders or polishing machines for use on floors and the like.

The primary object of the invention is to provide an improved detachable extension handle, so that the machine may be used on floors by the operator while in a standing position.

A further object of the invention is to provide an improved pivotal mounting for the extension handle, so that it will be held yieldingly in a desired angular position.

The invention is illustrated in a preferred embodiment in the accompanying drawings, in which—

Figure 1 is a broken side elevational view of a machine embodying the invention; Fig. 2, a fragmentary sectional view, taken as indicated at line 2—2 of Fig. 1; Fig. 3, a fragmentary sectional view, taken as indicated at line 3—3 of Fig. 1; Fig. 4, a broken sectional view, taken as indicated at line 4—4 of Fig. 1; Fig. 5, a fragmentary side elevational view of one of the clamping members and one of the lower yoke arms; and Fig. 6 is a fragmentary end elevational view, taken as indicated at line 6—6 of Fig. 5.

The rubbing machine is of the same general construction as that shown in my Patent No. 2,395,537, dated February 26, 1946, and has a housing frame 7 provided with a hand gripping member 8. The housing frame contains a vertically disposed electric motor adapted to drive a rubbing pad 19 with an orbital movement.

In order that the machine may be used conveniently by an operator in standing position, a detachable extension handle is provided which is the subject of the present invention. A pair of arcuate clamping members 9 and 10 are preferably made of metal and shaped so as to fit in opposed relation in the finger opening provided between the gripping member 8 and the housing 7. A machine screw 11 is provided in a counterbored opening 12 in the member 10 and makes a threaded connection with the clamping member 9 so as to draw the parts together tightly.

As best shown in Fig. 4, the clamping member 10 has an enlarged opening 13, through which extends a hollow boss 14 on the opposite clamping member 9. The boss has a counterbore to receive a compression spring 15. A pivot member 16 is journalled in the counter-bored boss and is tapped at one end, as indicated at 17, to receive a stud bolt 18.

A tubular extension handle 19 has a rubber handle grip 20 at its upper end, and is releasably gripped at its lower end by a yoke member 21, having downwardly extending arms 22 and 23. The tubular handle is clamped to the yoke by means of a machine screw 24. As shown in Fig. 4, the lower end of the yoke arm 22 is impaled by the pivot member, and its outward movement is prevented by the head 25. The lower end of the other yoke arm is counter-bored to receive one end of the pivot member and is rigidly secured to the pivot member by means of a stud bolt 18 and lock washer 26. Preferably a steel washer 27 is provided between the yoke arm 23 and the outer end of the boss 14, so as to form a friction clutch. It will be understood that the spring 15 urges the pivot member to the left and maintains a constant compressive force on the washer 27. The spring 15 has sufficient pressure so that the extension handle will yieldingly remain in an adjusted angular position, as desired by the operator.

The foregoing detailed description is given for clearness of understanding only, and no unnecessary limitations should be understood therefrom, for some modifications will be obvious to those skilled in the art.

I claim:

1. A detachable extension handle for a rubbing machine comprising: a pair of opposed clamping members adapted to fit into opposite sides of the finger opening in the gripping member of the machine; threaded means for drawing the clamping members together; a pivot member extending through said clamping members; and a long handle having a yoke at its lower end which spans the gripping member and has two arms pivotally connected to said pivot member.

2. A device as specified in claim 1, including a friction clutch between the arms of the yoke for yieldingly holding the handle in a desired angular position.

3. A device as specified in claim 1, in which a friction washer is provided between one of the yoke arms and a boss on the opposite clamping member, and a spring encircles the pivot member and compresses said friction washer.

STEPHEN A. CROSBY.

REFERENCES CITED

The following references are of record in the file of this patent:

UNITED STATES PATENTS

| Number | Name | Date |
|---|---|---|
| 910,160 | Zimmer | Jan. 19, 1909 |
| 1,994,677 | Wildhaber | Mar. 19, 1935 |
| 2,344,808 | Duffield | Mar. 21, 1944 |

FOREIGN PATENTS

| Number | Country | Date |
|---|---|---|
| 23,715 | Great Britain | Dec. 8, 1914 |
| 368,946 | Great Britain | Mar. 17, 1932 |